(12) United States Patent
Maraschino et al.

(10) Patent No.: US 6,416,658 B1
(45) Date of Patent: Jul. 9, 2002

(54) PROCESS FOR SIMULTANEOUS HYDROTREATING AND SPLITTING OF NAPHTHA STREAMS

(75) Inventors: Mario J. Maraschino, Houston; Montri Vichailak, Sugar Land; Bertrand Klussman, Houston; Harjeet Virdi, Sugar Land, all of TX (US)

(73) Assignee: Catalytic Distillation Technologies, Pasadena, TX (US)

(*) Notice: Subject to any disclaimer, the term of this patent is extended or adjusted under 35 U.S.C. 154(b) by 97 days.

(21) Appl. No.: 09/691,983

(22) Filed: Oct. 19, 2000

(51) Int. Cl.[7] .................. C10G 45/02; C10G 45/32
(52) U.S. Cl. ............... 208/189; 208/213; 208/216 R; 208/222; 208/250
(58) Field of Search ............... 208/189, 213, 208/216 R, 222, 250

(56) References Cited

U.S. PATENT DOCUMENTS

| | | | |
|---|---|---|---|
| 4,550,012 A | 10/1985 | Penick | 422/106 |
| 4,755,281 A | 7/1988 | Penick | 208/108 |
| 5,320,742 A | 6/1994 | Fletcher et al. | 208/89 |
| 5,431,888 A * | 7/1995 | Hickey et al. | 422/191 |
| 5,510,568 A | 4/1996 | Hearn | 585/834 |
| 5,595,634 A | 1/1997 | Hearn et al. | 203/29 |
| 5,597,476 A | 1/1997 | Hearn et al. | 208/208 |
| 5,629,451 A | 5/1997 | Hearn et al. | 564/490 |
| 5,709,780 A | 1/1998 | Ognisty et al. | 202/158 |
| 5,755,933 A | 5/1998 | Ognisty et al. | 202/158 |
| 5,779,883 A | 7/1998 | Hearn et al. | 208/213 |
| 5,942,456 A * | 8/1999 | Crossland et al. | 502/2 |
| 6,083,378 A | 7/2000 | Gildert et al. | 208/209 |

* cited by examiner

Primary Examiner—Bekir L. Yildirim
(74) Attorney, Agent, or Firm—Kenneth H. Johnson (57) ABSTRACT

A process for concurrently fractionating and hydrotreating of a full range naphtha stream. The full boiling range naphtha stream is subjected to simultaneous hydrodesulfurization and splitting into a light boiling range naphtha and a heavy boiling range naphtha, which have been treated to covert mercaptans in the fractions to $H_2S$, which is separated with and separated from the light naphtha wherein the improvement is a further hydrodesulfurization by contacting the light boiling range naphtha with hydrogen in countercurrent flow in a fixed bed of hydrodesulfurization catalyst to remove recombinant mercaptans which are formed by the reverse reaction of $H_2S$ with olefins in the naphtha during the initial hydrodesulfurization.

12 Claims, 4 Drawing Sheets

PROCESS FOR SIMULTANEOUS HYDROTREATING AND SPLITTING OF NAPHTHA STREAMS

BACKGROUND OF THE INVENTION

1. Field of the Invention

The present invention relates to a process for concurrently fractionating and hydrotreating a full range naphtha stream. More particularly the full boiling range naphtha stream is subjected to simultaneous hydrodesulfurization and splitting into a light boiling range naphtha and a heavy boiling range naphtha and thereafter polishing the light fraction or the recombined light and heavy fraction in a manner to prevent or reduce recombinant mercaptans. The bottoms stream from the CDHDS may also be directed to the countercurrent (side-stripper) polishing reactor to good effect.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates and cyclic and polycyclic compounds. The higher sulfur content crudes tend to be naphthenic. Treatment of the different straight run naphthas may be slightly different depending upon their composition due to crude source.

Reformed naphtha or reformate generally requires no further treatment except perhaps distillation or solvent extraction for valuable aromatic product removal. Reformed naphthas have essentially no sulfur contaminants due to the severity of their pretreatment for the process and the process itself.

Cracked naphtha as it comes from the catalytic cracker has a relatively high octane number as a result of the olefinic and aromatic compounds contained therein. In some cases this fraction may contribute as much as half of the gasoline in the refinery pool together with a significant portion of the octane. Such cracked-steam sources such as from FCC, coker, visbreaker (and the like) typically contain around 90% of all of the "destination sulfur" that would have reported to refinery gasoline in the absence of all desulfurization treatment.

Catalytically cracked naphtha gasoline boiling range material currently forms a significant part (~⅓) of the gasoline product pool in the United States and it provides the largest portion of the sulfur. The sulfur impurities may require removal, usually by hydrotreating, in order to comply with product specifications or to ensure compliance with environmental regulations.

The most common method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

$$RSH + H_2 \rightarrow RH + H_2S \quad (1)$$

$$RCl + H_2 \rightarrow RH + HCl \quad (2)$$

$$2RN + 4H_2 \rightarrow RH + NH_3 \quad (3)$$

$$ROOH + 2H_2 \rightarrow RH + H_2O \quad (4)$$

Typical operating conditions for naphtha HDS reactions are:

| | |
|---|---|
| Temperature, °F. | 450–650 |
| Pressure, psig | 250–750 |
| H₂ recycle rate, SCF/bbl | 700–2000 |
| Fresh H₂ makeup, SCF/bbl | 150–500 |

After the hydrotreating is complete the product may be fractionated or simply flashed to release the hydrogen sulfide and collect the now desulfurized naphtha.

In addition to supplying high octane blending components the cracked naphthas are often used as sources of olefins in other processes such as etherifications. The conditions of hydrotreating of the naphtha fraction to remove sulfur will also saturate some of the olefinic compounds in the fraction, thereby reducing the octane and causing a loss of source olefins.

Various proposals have been made for removing sulfur while retaining the more desirable olefins. Since the olefins in the cracked naphtha are mainly in the low boiling fraction of these naphthas and the sulfur containing impurities tend to be concentrated in the high boiling fraction the most common solution has been prefractionation prior to hydrotreating. The prefractionation produces a light boiling range naphtha which boils in the range of C₅ to about 250° F. and a heavy boiling range naphtha which boils in the range of from about 250–475° F.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been removed by oxidative processes involving caustic washing. A combination oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

In addition to treating the lighter portion of the naphtha to remove the mercaptans it traditionally has been used as feed to a catalytic reforming unit to increase the octane number if necessary. Also the lighter fraction may be subjected to further separation to remove the valuable C₅ olefins (amylenes) which are useful in preparing ethers.

U.S. Pat No. 6,083,378 discloses a naphtha splitter as a distillation column reactor to treat a portion or all of the naphtha to remove the organic sulfur compounds contained therein. The catalyst is placed in the distillation column reactor such that the selected portion of the naphtha is contacted with the catalyst and treated. The catalyst may be placed in the rectification section to treat the lighter boiling range components only, in the stripping section to treat the heavier boiling range components only, or throughout the column to widely treat the naphtha. In addition the distillation column reactor may be combined with standard single pass fixed bed reactors or another distillation column reactor to fine tune the treatment.

It has been discovered that during processing, if the $H_2S$ is not removed from the catalyst zones quickly problems arise. The $H_2S$ can recombine to form mercaptans thus increasing the amount of sulfur in the product. Additional treatment in subsequent units would cause more of the olefins in the feed to be saturated, thus losing octane and consuming hydrogen.

It is an advantage of the present invention that the sulfur may be removed from the light and/or heavy naphtha portions of the stream without any substantial loss of olefins by the recombination of $H_2S$ with olefins. Thus, very low levels of sulfur may be obtained in the selected fraction and/or the entire stream. It is a further advantage that most of the $H_2S$ dissolved in the light naphtha is removed.

SUMMARY OF THE INVENTION

Briefly the present invention is an improvement in a catalytic distillation hydrodesulfurization process comprising:

(a) feeding a naphtha boiling range hydrocarbon stream containing organic sulfur compounds and hydrogen to a distillation column reactor;

(b) concurrently in said distillation column reactor
　(i) separating said naphtha into a light boiling range naphtha and a heavy boiling range naphtha
　(ii) contacting a fraction of said naphtha and hydrogen with a hydrodesulfurization catalyst to selectively react the organic sulfur compounds therein with said hydrogen to form $H_2S$;

(c) recovering a portion of said light boiling range naphtha wherein said light boiling range naphtha contains recombinant mercaptans;

(d) removing said heavier boiling range naphtha from said distillation column reactor, e.g. as bottoms;

wherein the improvement comprises contacting said portion of said light boiling range naphtha with hydrogen in countercurrent flow in a fixed bed of hydrodesulfurization catalyst to reduce the recombinant mercaptans therein. Another embodiment of the improvement is to direct both the overheads and the bottoms of the catalytic distillation hydrodesulfurization column together through the countercurrent, side-mounted, fixed-bed secondary-hydrodesulfurization polishing reactor.

In the counterflow operation the newly released $H_2S$ at a given location is unavailable to react again with olefins in the lower sections of the column to form another mercaptan. Hence, there is substantially no $H_2S$ arriving in the bottom of the column and therefore there is no equilibrium limitation on the mercaptan removal.

Since the first column acts as a splitter, either the light naphtha fraction or the heavy naphtha fraction may be hydrodesulfurized in catalytic distillation step. Preferably both fraction are hydrotreated. The $H_2S$ produced in the catalytic distillation whether from one or both fractions is removed with the light naphtha fraction, and separated therefrom. Thus, it is in the light naphtha fraction that the recombinant mercaptans are most likely to form, because the $H_2S$ will be in contact with that fraction during its recovery.

"Recombinant mercaptans" as that term is used herein means those mercaptans which are not in the feed to the present process but are the reaction products of the $H_2S$ generated by the hydrogenation of the present process and alkenes in the feed. Thus, the recombinant mercaptans are not necessarily the same as those destroyed by the hydrogenation of the present process, although they may be. The present catalytic distillation hydrogenation is considered to dissociate substantially all of the mercaptans in the feed and the small amounts of mercaptans observed in the product streams are in fact recombinant mercaptans. Although the catalytic distillation reaction is superior to the prior art straight hydrogenation for removing mercaptans, the dynamic system of a catalytic distillation allows sufficient time for some undesirable recombination reaction to occur. Thus, in the present invention the combination of a less efficient countercurrent, straight pass hydrodesulfurization is sufficient to dissociate the small quantities of recombinant mercaptans by having only a limited contact of the produced $H_2S$ before it is removed from the reaction zone.

As used herein the term "distillation column reactor" means a distillation column which also contains catalyst such that reaction and distillation are going on concurrently in the column. In a preferred embodiment the catalyst is prepared as a distillation structure and serves as both the catalyst and distillation structure. The term "reactive distillation" is used to describe the concurrent reaction and fractionation in a column. For the purposes of the present invention, the term "catalytic distillation" includes reactive distillation and any other process of concurrent reaction and fractional distillation in a column regardless of the designation applied thereto.

DETAILED DESCRIPTION OF THE INVENTION

The feed to the process comprises a sulfur-containing petroleum fraction which boils in the gasoline boiling range. Feeds of this type include light naphthas having a boiling range of about $C_5$ to 330° F. and full range naphthas having a boiling range of $C_5$ to 400° F. end point to as high as, e.g. 450° F. end point. Generally the process is useful on the naphtha boiling range material from catalytic cracker products because they contain the desired olefins and unwanted sulfur compounds. Straight run naphthas have very little olefinic material, and unless the crude source is "sour", very little sulfur.

The sulfur content of the catalytically cracked fractions will depend upon the sulfur content of the feed to the cracker as well as the boiling range of the selected fraction used as feed to the process. Lighter fractions will have lower sulfur contents than higher boiling fractions. The front end of the naphtha contains most of the high octane olefins but relatively little of the sulfur. The sulfur components in the front end are mainly mercaptans and typical of those compounds are: methyl mercaptan (b.p. 43° F.), ethyl mercaptan (b.p. 99° F.), n-propyl mercaptan (b.p. 154° F.), iso-propyl mercaptan (b.p. 135–140° F.), iso-butyl mercaptan (b.p. 190° F.), tert-butyl mercaptan (b.p. 147° F.), n-butyl mercaptan (b.p. 208° F.), sec-butyl mercaptan (b.p. 203° F.), iso-amyl mercaptan (b.p. 250° F.), n-amyl mercaptan (b.p. 259° F.), a-methylbutyl mercaptan (b.p. 234° F.), a-ethylpropyl mercaptan (b.p. 293° F.), n-hexyl mercaptan (b.p. 304° F.), 2-mercapto hexane (b.p. 284° F.), and 3-mercapto hexane (b.p. 135° F.). Typical sulfur compounds found in the heavier boiling fraction include the heavier mercaptans, thiophenes, sulfides and disulfides.

The reaction of organic sulfur compounds in a refinery stream with hydrogen over a catalyst to form $H_2S$ is typically called hydrodesulfurization. Hydrotreating is a broader term which includes saturation of olefins and aromatics and the reaction of organic nitrogen compounds to form ammonia. However hydrodesulfurization is included and is sometimes simply referred to as hydrotreating.

Catalysts which are useful for the hydrodesulfurization reaction include Group VIII metals such as cobalt, nickel, palladium, alone or in combination with other metals such as molybdenum or tungsten on a suitable support which may be alumina, silica-alumina, titania-zirconia or the like. Normally the metals are provided as the oxides of the metals supported on extrudates or spheres and as such are not generally useful as distillation structures. However, in the countercurrent fixed-bed polishing reactor, such shapes are directly useful when loaded at optimal particle size which would be slightly larger than those typically encountered in conventional concurrent trickle bed reactor technology.

The catalysts contain components from Group V, VIB, VIII metals of the Periodic Table or mixtures thereof. The use of the distillation system reduces the deactivation and provides for longer runs than the fixed bed hydrogenation units of the prior art. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams and hydrogen. The catalyst may also catalyze the hydrogenation of the olefins and polyolefins contained within the light cracked naphtha and to a lesser degree the isomerization of some of the mono-olefins. The hydrogenation, especially of the mono-olefins in the lighter fraction may not be desirable.

If at the temperature of use in the present process, the ratio of the partial pressures of $H_2S/(H_2S+H_2)$ falls below a temperature-dependent critical value, then desulfiding of the catalyst is likely to occur. Desulfiding is not a harmless event, because the mixed catalysts are typically formulated to yield optimally formed metal clusters on the alumina substrate. Typically, one of the two metals will form base clusters on the alumina support, and the second metal will tend to decorate the first metal along the edges of those clusters. The process of desulfiding a catalyst and then subsequently resulfiding that catalyst is not an identically reversible process. Catalyst mishandled in this way will usually suffer noticeable activity loss and selectivity loss. By selectivity loss, is meant that more olefin loss and more octane-number loss will be registered at a given level of total-sulfur conversion after a desulfiding incident when compared with earlier performance. The desulfiding is most likely to occur in the lower portion of the catalyst bed that would be $H_2S$ deprived compared to other portions of the catalyst beds where $H_2S$ is produced by the decomposition of the mercaptans. The desulfiding of the catalyst may be reduced by introducing $H_2S$ in to the catalytic distillation column and/or the polishing column, for example with the hydrogen feed in an amount sufficient to maintain the catalyst.

The catalytic distillation step is carried out at a temperature in the range of 400 to 800° F. at 50 to 400 psig pressure with hydrogen partial pressure in the range of 0.1 to 100 psi at 20 to 1200 scf/bbl at WHSV in the range of 0.1 to 10 $hr^{-1}$ based on feed rate and particulate catalyst packaged in structures. If advanced specialty catalystic structures are used (where catalyst is one with the structure rather than a form of packaged pellets to be held in place by structure). The LHSV for such systems should be about in the same range as those of granular-based catalytic distillation catalyst systems as just referenced.

In the countercurrent flow reaction the temperature is generally in the range of 450 to 600° F. at 150 to 500 psig pressure. The hydrogen partial pressure is generally in the range of 7 to 450 psi. The hydrogen is fed below the catalyst bed at 50 to 250 scfh/bbl. The light naphtha is fed in usually in the range of 3–15 WHSV $hr^{-1}$. The catalyst maybe the same as that used in the catalytic distillation structure and it may be utilized in such a structure, although it is not necessary to do so. Generally catalytic particles are ⅛"–½" dimension to facilitate favorable mass flow and favorable fluid-to-particle mass transfer characteristics.

Preferably there is a stripper section above the catalyst bed in the fixed bed countercurrent reactor. This provides for removal of additional dissolved $H_2S$. For example, in order to reduce recombinant in a feed containing mercaptans 252 ppm $H_2S$ to 2–5 ppm in the effluent from the counterflow trickle bed reactor which is operated at 350 psig, 490° F., WHSV of 8 $hr^{-1}$, in a 7 foot bed of Co/M, ¼" catalyst, a stripper 4–5 theoretical stage is required above the catalyst bed. This arrangement reduces the dissolved $H_2S$ in the reaction zone, hence reducing the recombinant mercaptans to negligible levels and the dissolved $H_2S$ to e.g., 5–10 ppm.

Figure 4:
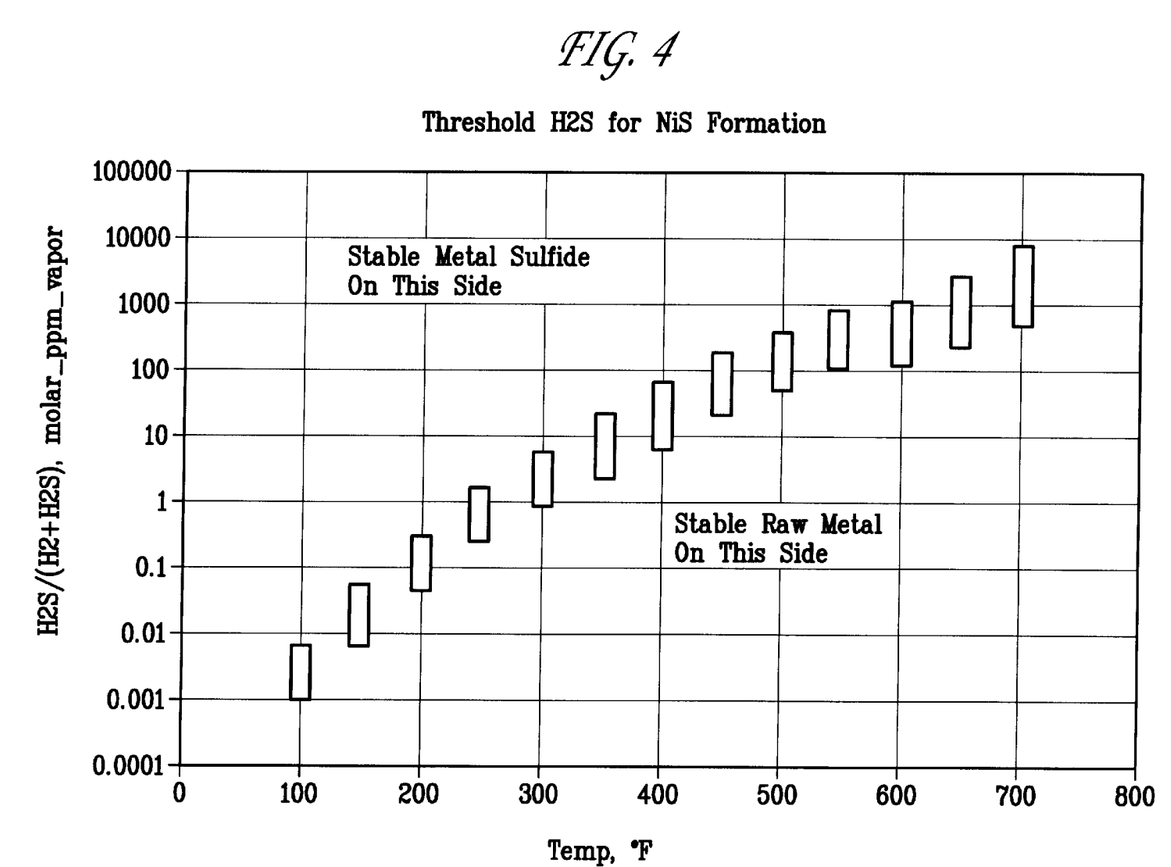
FIG. 4 is a graphic representation of the approximate concentration of $H_2S$ necessary to avoid desulfiding the hydrodesulfurization catalyst.

The concentration of $H_2S$ necessary to avoid desulfiding the metals on the catalyst is quite small. In FIG. 4 the regions of $[H_2S/(H_2S+H_2)]$ that support the existence of NiS and those that support the existence of metallic Ni are provided. (very similar considerations apply to the other metals that make up most of the HDS catalysts.) The bandwidth at the line of transition between the zones represents the variability of the prediction. Note that at 450–500° F., only about 100 molar ppm $H_2S$ in hydrogen in vapor (i.e., on a hydrocarbon-free and other-inerts free basis) is enough to avoid desulfiding of previously sulfided nickel in the mixed-metal catalyst formulation. So long as the required amount of $H_2S$ is equaled or exceeded everywhere in the vapor exposed to the bed, the catalyst will not desulfide. Also, as temperature is increased, the amount of $H_2S$ relative to hydrogen present that is necessary to achieve this control will increase as well as illustrated in FIG. 4.

The properties of a typical hydrodesulfurization catalyst are shown in Table I below.

TABLE I

| Manufacture | Criterion Catalyst Co. |
|---|---|
| Designation | C-448 |
| Form | Tri-lobe Extrudate |
| Nominal size | 1.2 mm diameter |

| Metal, | Wt. % |
|---|---|
| Cobalt | 2–5% |
| Molybdenum | 5–20% |
| Support | Alumina |

The catalyst typically is in the form of extrudates having a diameter of ⅛, 1/16 or 1/32 inches and an L/D of 1.5 to 10. The catalyst also may be in the form of spheres having the same diameters. They may be directly loaded into standard single pass fixed bed reactors which include supports and reactant distribution structures. However, in their regular form they form too compact a mass for operation in the catalytic distillation hydrodesulfurization tower and must then be prepared in the form of a catalytic distillation structure. (However, in the polishing reactor, extrudates are perfectly acceptable if the size range is in the ⅛, ¼, ⅜, ½ inch ranges. Typically particles used in countercurrent fixed bed operation are roughly twice the average diameter of those used in corresponding concurrent fixed bed reactors). The catalytic distillation structure must be able to function as catalyst and as mass transfer medium. The catalyst must be suitably supported and spaced within the column to act as a catalytic distillation structure. In a preferred embodiment the catalyst is contained in a woven wire mesh structure as disclosed in U.S. Pat. No. 5,266,546, which is hereby incorporated by reference. More preferably the catalyst is contained in a plurality of wire mesh tubes closed at either end and laid across a sheet of wire mesh fabric such as demister wire. The sheet and tubes are then rolled into a bale for loading into the distillation column reactor. This embodiment is described in U.S. Pat. No. 5,431,890 which is hereby incorporated by reference. Other catalytic distillation structures useful for this purpose are disclosed in U.S. Pat. Nos. 4,731,229, 5,073,236, 5,431,890 and 5,730,843 which are also incorporated by reference.

Reaction conditions for sulfur removal only in a standard single pass fixed bed reactor are in the range of 500–700° F. at pressures of between 400–1000 psig. Residence times expressed as liquid hourly space velocity are generally typically between 1.0 and 10. The naphtha in the single pass fixed bed reaction may be in the liquid phase or gaseous phase depending on the temperature and pressure, with total pressure and hydrogen gas rate adjusted to attain hydrogen partial pressures in the 100–600 psia range. The operation of the single pass fixed bed hydrodesulfurization is otherwise well known in the art.

The conditions suitable for the desulfurization of naphtha in a distillation column reactor are very different than those in a standard trickle bed reactor, especially with regard to total pressure and hydrogen partial pressure. Typical conditions in a reaction distillation zone of a naphtha hydrodesulfurization distillation column reactor are:

| Temperature | 450–700° F. |
|---|---|
| Total Pressure | 75–300 psig |
| $H_2$ partial pressure | 6–75 psia |
| WHSV of naphtha | about 1–5 |
| $H_2$ rate | 10–1000 scf/bbl |

The operation of the distillation column reactor results in both a liquid and vapor phase within the distillation reaction zone. A considerable portion of the vapor is hydrogen while a portion is vaporous hydrocarbon from the petroleum fraction. Actual separation may only be a secondary consideration.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation. In particular, sulfur species concentrate in the liquid while the olefins and $H_2S$ concentrate in the vapor allowing for high conversion of the sulfur compounds with low conversion of the olefin species.

The result of the operation of the process in the distillation column reactor is that lower hydrogen partial pressures (and thus lower total pressures) may be used. As in any distillation there is a temperature gradient within the distillation column reactor. The temperature at the lower end of the column contains higher boiling material and thus is at a higher temperature than the upper end of the column. The lower boiling fraction, which contains more easily removable sulfur compounds, is subjected to lower temperatures at the top of the column which provides for greater selectivity, that is, no hydrocracking or less saturation of desirable olefinic compounds. The higher boiling portion is subjected to higher temperatures in the lower end of the distillation column reactor to crack open the sulfur containing ring compounds and hydrogenate the sulfur.

It is believed that in the present distillation column reaction is a benefit first, because the reaction is occurring concurrently with distillation, the initial reaction products and other stream components are removed from the reaction zone as quickly as possible reducing the likelihood of side reactions. Second, because all the components are boiling the temperature of reaction is controlled by the boiling point of the mixture at the system pressure. The heat of reaction simply creates more boil up, but no increase in temperature at a given pressure. As a result, a great deal of control over the rate of reaction and distribution of products can be achieved by regulating the system pressure. A further benefit that this reaction may gain from distillation column reactions is the washing effect that the internal reflux provides to the catalyst thereby reducing polymer build up and coking.

Finally, the upward flowing hydrogen acts as a stripping agent to help remove the $H_2S$ which is produced in the distillation reaction zone.

Figure 1:
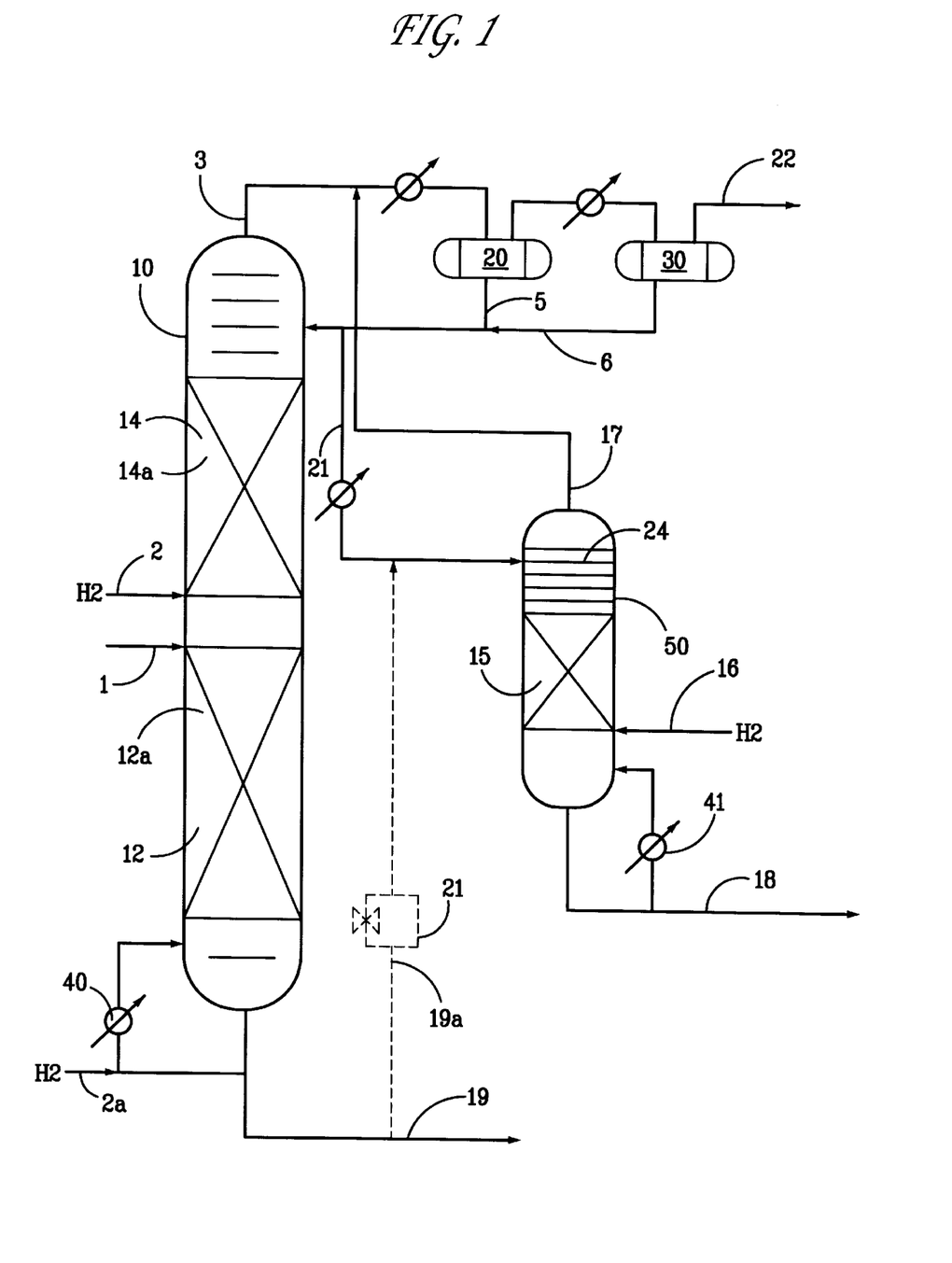
FIG. 1 is a simplified flow diagram of one embodiment of the invention having catalyst beds in a distillation column/naphtha splitter which are used to treat both the light and heavy fraction to hydrogenate and remove mercaptans by reactive distillation in which the overhead light fraction is recovered and further hydrodesulfurized in a separate fixed bed countercurrent flow polishing reactor.

In the polishing reactor or section, all of the liquid is downflow and the hydrogen is upflow, thus the stripping action is also present and the very small amounts of recombinant mercaptans are readily reduced to even lower levels. In the divided wall column the condition pressure is the same in both sides of the wall, but the temperature profile on either side of the divided wall may in general be different. As discussed above, the optimum conditions for the two types of reactions are not in the same range. Since the major hydrodesulfurization is going on in the reactive distillation, the activity of the countercurrent flow straight pass hydrodesulfurization is somewhat compromised, however it is adequate to achieve a sufficient removal of the recombinant mercaptans to meet the objectives of the treatment. The attached FIGS. show various processing schemes for obtaining particular results. The same elements have been given the same designations in the figures. It should be appreciated that rearrangement of the elements in the various embodiments is all directed to the separation of naphthas and the reduction in organic sulfur compounds. In FIG. 1 the catalyst 12a and 14a is loaded into the stripping section 12 and the rectification section 14 of a naphtha splitter 10 configured as a distillation column reactor. The naphtha feed is into the distillation column reactor 10 between the sections via flow line 1 and hydrogen is fed below both sections via lines 2 and 2a. The light naphtha is boiled up into the rectification section 14 and removed along with unreacted hydrogen and $H_2S$ as overheads via flow line 3. The light naphtha is condensed in condensers 20 and separated from the hydrogen and $H_2S$ and other lights in receiver/separator 30 via flow line 22. The liquid from the separator 20 and 30 is removed via flow line 5 and 5a, respectively and a portion returned to the distillation column reactor as reflux via flow line 6. The recovered liquid portion not returned as reflux is directed to the straight pass countercurrent flow reactor 50, via line 21, where it contacts the hydrogen in the hydrodesulfurization catalyst bed 15. The hydrogen is fed via line 16 below the bed 15. The hydrogen passes upward through the catalyst bed and the downflowing light naphtha where it contacts the recombinant mercaptans and covers a portion to $H_2S$. The upflowing hydrogen aids in stripping the $H_2S$, which with the unreacted hydrogen exits via line 17 and is sent to the separator 20 for treatment with the overhead. A rectification section 24 is provided to facilitate the $H_2S$ removal and to separate the liquids which may be entrained in the upflow gas stream. Light naphtha product is recovered via line 18 and heavy naphtha product is recovered via line 19. Alternatively, the heavy naphtha may be directed via line 19a through cooler 21 and co-fed with the light naphtha to reactor 50. The catalytic distillation column has a reboiler 40 and the fixed bed reactor 50 may have an optional reboiler 41, which will result in some reflux into the catalyst bed. The upper section of reactor 50 is preferably a multistage contact zone where $H_2S$ dissolved in the incoming light naphtha can be stripped out so that dissolved $H_2S$ is not present in the catalyst zone 15. The preferred operating conditions and results for the distillation column reactor 10 of FIG. 1 are as follows:

| | |
|---|---|
| Pressure, psig | 100–300 |
| $H_2$ rate, scfh | 150–1000 |
| $H_2$ partial pres., psi | 5–75 |
| WHSV | 0.2–10 |
| % HDS | 90–99 |

In the fixed bed reactor 50 of FIG. 1 the preferred operating conditions and results are:

| | |
|---|---|
| Pressure, psig | 150–500 |
| $H_2$ rate, scfh | 50–225 |
| $H_2$ partial pres., psi | 10–180 |
| WHSV | 3–16 |
| Mercaptans, ppm | <2–10 |

Figure 2:
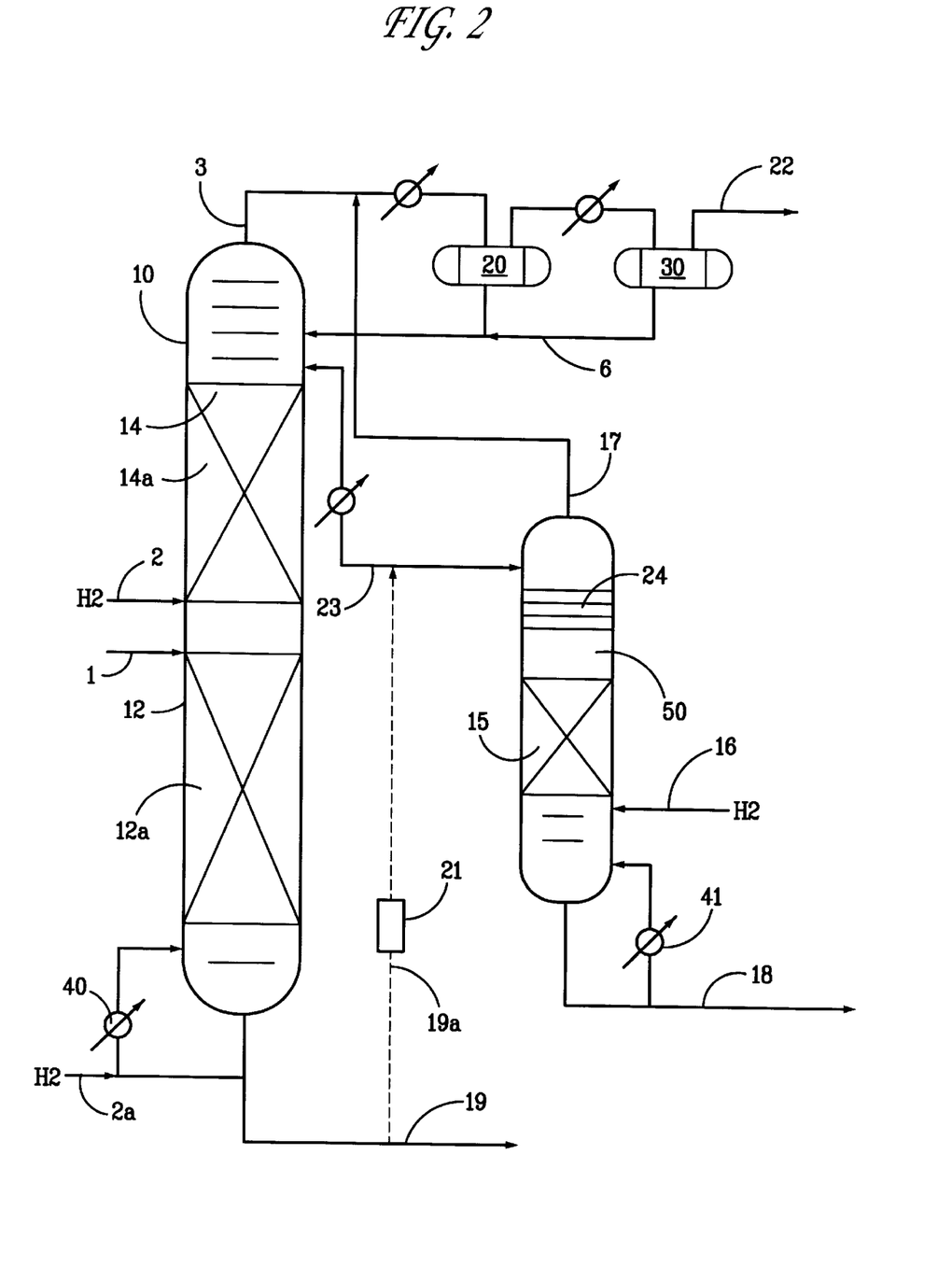
FIG. 2 is a simplified flow diagram of another embodiment of the invention having catalyst beds in a distillation column/naphtha splitter which are used to treat both the light and heavy fraction to hydrogenate and remove mercaptans by reactive distillation in which a side draw light fraction is recovered and further hydrodesulfurized in a separate fixed bed countercurrent flow polishing reactor.

A second embodiment is shown in FIG. 2. This embodiment differs from that of FIG. 1 only by having a sidedraw 23 in the stripping section 14 which is the source of the feed to the straight pass countercurrent flow reactor 50. The remaining description is identical to FIG. 1. An alternative embodiment is temperature adjustment of stream 19 and cofeeding it along with stream 23 to the countercurrent reactor 50.

Figure 3:
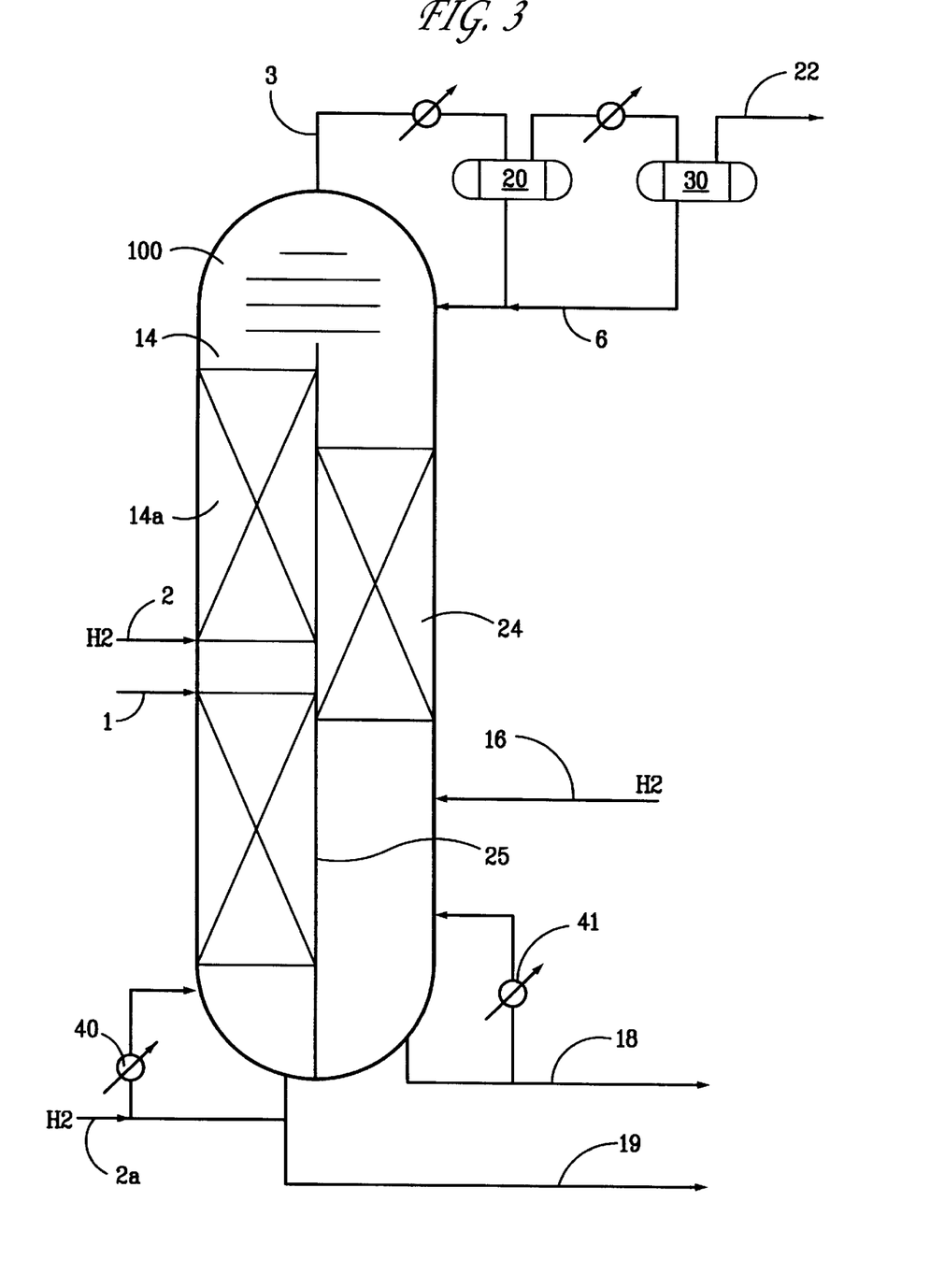
FIG. 3 is a simplified flow diagram of another embodiment of the invention in a vertically partitioned column having a distillation column/naphtha splitter in one section in which catalyst beds are used to treat both the light and heavy fraction to hydrogenate and remove mercaptans by reactive distillation and a light fraction is further hydrodesulfurized in a separate fixed bed countercurrent flow within a separate section of the divided wall column.

A third embodiment is shown in FIG. 3 which differs from that shown in FIGS. 1 and 2 by incorporating the straight pass countercurrent flow reactor, or at least the function of that reactor into the same column 100 as the catalytic distillation. A partition 25 extends from the bottom of column 100 to point in the upper portion of the column, dividing the column vertically through most of its height. On one side of the partition, the components of the catalytic distillation column are arrayed as heretofore described. On the other side of partition 25 the components of the straight pass countercurrent flow reactor are arrayed. The functioning of each vertical division is as heretofore described for the individually housed reactors. The main differences are the operation of the distillation column with total reflux via line 6. A portion of the reflux returns to the distillation reaction and a portion passes into the fixed hydrodesulfurization bed 24 with a suitable internal reflux splitting arrangement installed for that purpose. The divisions of the column are sized in substantially the same manner as the individual columns. The "divided wall" columns are less well known in the art, but have been described in U.S. Pat. Nos. 5,709,780 and 5,755,933, and although they have not been used in the process as disclosed here, their manner of operation and permutations as applicable herein can be readily appreciated.

In the fixed bed reactor section of FIG. 3 the preferred operating conditions and results are:

| | CD | FIXED BED |
|---|---|---|
| Pressure, psig | 115–275 | 150–400 |
| $H_2$ rate, scf/bbl | 200–500 | 40–200 |
| $H_2$ partial pres., psi | 10–70 | 7–100 |
| WHSV | 1–5 | 3–16 |
| Mercaptans, ppm | 20–150 | 2–10 |

The hydrogen may be recycled back to the reactors. Vents may be sufficient to maintain the $H_2S$ levels low enough for the reaction. However, if desired, the recycle gas may be scrubbed using conventional methods to remove the $H_2S$.

The invention claimed is:

1. In a catalytic distillation hydrodesulfurization process comprising:
   (a) feeding a naphtha boiling range hydrocarbon stream containing organic sulfur compounds and hydrogen to a distillation column reactor;
   (b) concurrently in said distillation column reactor
      (i) separating said naphtha into a light boiling range naphtha and a heavy boiling range naphtha
      (ii) contacting a fraction of said naphtha and hydrogen with a hydrodesulfurization catalyst to selectively react the organic sulfur compounds therein with said hydrogen to form $H_2S$;
   (c) recovering a portion of said light boiling range naphtha wherein said light boiling range naphtha contains recombinant mercaptans; and
   (d) removing said heavier boiling range naphtha from said distillation column reactor; wherein the improvement comprises contacting said portion of said light boiling range naphtha with hydrogen in countercurrent flow in a fixed bed of hydrodesulfurization catalyst to reduce the recombinant mercaptans therein.

2. The process according to claim 1 wherein said portion of light boiling naphtha comprises overhead.

3. The process according to claim 1 wherein said portion of light boiling naphtha comprises sidedraw.

4. The process according to claim 1 wherein said portion of light boiling naphtha comprises reflux.

5. A process for the hydrodesulfurization of naphtha in a distillation column reactor having a stripping section and a rectification section, comprising the steps of:

(a) feeding a naphtha boiling range hydrocarbon stream containing organic sulfur compounds and hydrogen to a distillation column reactor above said stripping section;

(b) concurrently in said distillation column reactor
   (i) separating said naphtha into a light boiling range naphtha fraction and a heavy boiling range naphtha fraction;
   (ii) contacting at least one of said naphtha fractions and hydrogen with a hydrodesulfurization catalyst in said stripping section to selectively react the heavier organic sulfur compounds with said hydrogen to form $H_2S$;

(c) removing said light boiling range naphtha fraction, $H_2S$ and unreacted hydrogen and recombinant mercaptans from said distillation column reactor as overheads;

(d) removing said heavier boiling range naphtha from said distillation column reactor;

(e) contacting a portion of said light boiling range naphtha with hydrogen in countercurrent flow in a fixed bed of hydrodesulfurization catalyst to reduce the recombinant mercaptans therein.

6. The process according to claim 5 wherein said light boiling naphtha fraction is hydrodesulfurized in (b).

7. The process according to claim 5 wherein said heavy boiling naphtha fraction is hydrodesulfurized in (b).

8. The process according to claim 5 wherein said light boiling naphtha fraction and said heavy boiling fraction are hydrodesulfurized in (b).

9. The process according to claim 1, 2, 3, 4, 5, 6, 7 or 8 wherein said hydrodesulfurization catalyst comprises a metal sulfide.

10. The process according to claim 9 wherein the molar ratio of $H_2S/(H_2S+H_2)$ is equal to or greater than that under which said metal sulfide is desulfided.

11. The process according to claim 5 wherein said heavier boiling range naphtha of step (d) is combined with the light boiling range naphtha of step (e) and contacted with hydrogen in counterflow in said fixed bed hydrodesulfurization catalyst.

12. The process according to claim 1, 2, 3, 4, 5, 6, 7 or 8 wherein $H_2S$ is added to the hydrogen in at least one of said catalytic distillation columns or in said fixed bed in an amount sufficient to maintain the hydrodesulfurization catalyst in an active state.

* * * * *